(12) United States Patent
Willis et al.

(10) Patent No.: US 7,318,968 B2
(45) Date of Patent: Jan. 15, 2008

(54) SYSTEM AND METHOD FOR FORMING A LOW TEMPERATURE CURED CERAMIC COATING FOR ELEVATED TEMPERATURE APPLICATIONS

(75) Inventors: John Willis, Malibu, CA (US); Steven J. Null, Mission Viejo, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 39 days.

(21) Appl. No.: 10/929,304

(22) Filed: Aug. 30, 2004

(65) Prior Publication Data
US 2005/0025983 A1 Feb. 3, 2005

Related U.S. Application Data

(62) Division of application No. 10/359,501, filed on Feb. 5, 2003, now Pat. No. 6,797,327.

(51) Int. Cl.
*B32B 9/00* (2006.01)
(52) U.S. Cl. .............. 428/702; 428/426; 428/446; 428/697; 428/913; 428/701
(58) Field of Classification Search ........... 428/702, 428/426, 446, 697, 913; 106/600, 635
See application file for complete search history.

(56) References Cited

U.S. PATENT DOCUMENTS

| | | | |
|---|---|---|---|
| 3,421,909 A * | 1/1969 | Rusher | 106/14.17 |
| 3,939,295 A | 2/1976 | Robertson et al. | |
| 4,950,627 A | 8/1990 | Tokarz et al. | |
| 5,034,358 A | 7/1991 | MacMillan | |
| 5,626,923 A | 5/1997 | Fitzgibbons et al. | |
| 5,693,365 A | 12/1997 | Teranishi et al. | |
| 5,747,623 A | 5/1998 | Matsuo et al. | |
| 6,042,878 A | 3/2000 | Bruce | |
| 6,060,114 A | 5/2000 | Sherman et al. | |
| 6,464,774 B1 | 10/2002 | Satoh | |
| 6,544,589 B2 | 4/2003 | Willis et al. | |

FOREIGN PATENT DOCUMENTS

RU 2 105 737 2/1998

OTHER PUBLICATIONS

European Search Report issued for EP 03 25 6846.1, dated Jul. 11, 2005.

* cited by examiner

*Primary Examiner*—Jennifer C. McNeil
(74) *Attorney, Agent, or Firm*—Fulbright & Jaworski LLP

(57) ABSTRACT

A method for forming an elevated temperature durable coating on a surface of a substrate includes applying an aqueous slurry comprising lithium silicate, sodium silicate, potassium silicate, zirconia powder, a fibrous agent, and a magnetic powder to a surface of a substrate in one or more layers of substantially uniform thickness to form a coating. A substantially controlled humidity environment is maintained during application of the aqueous slurry and the coating is ambient dried for a period. A drying agent is applied to the coating and formation of a dry crust is prevented on the coating during ambient drying. After the period, the coating is heat cured.

15 Claims, 1 Drawing Sheet

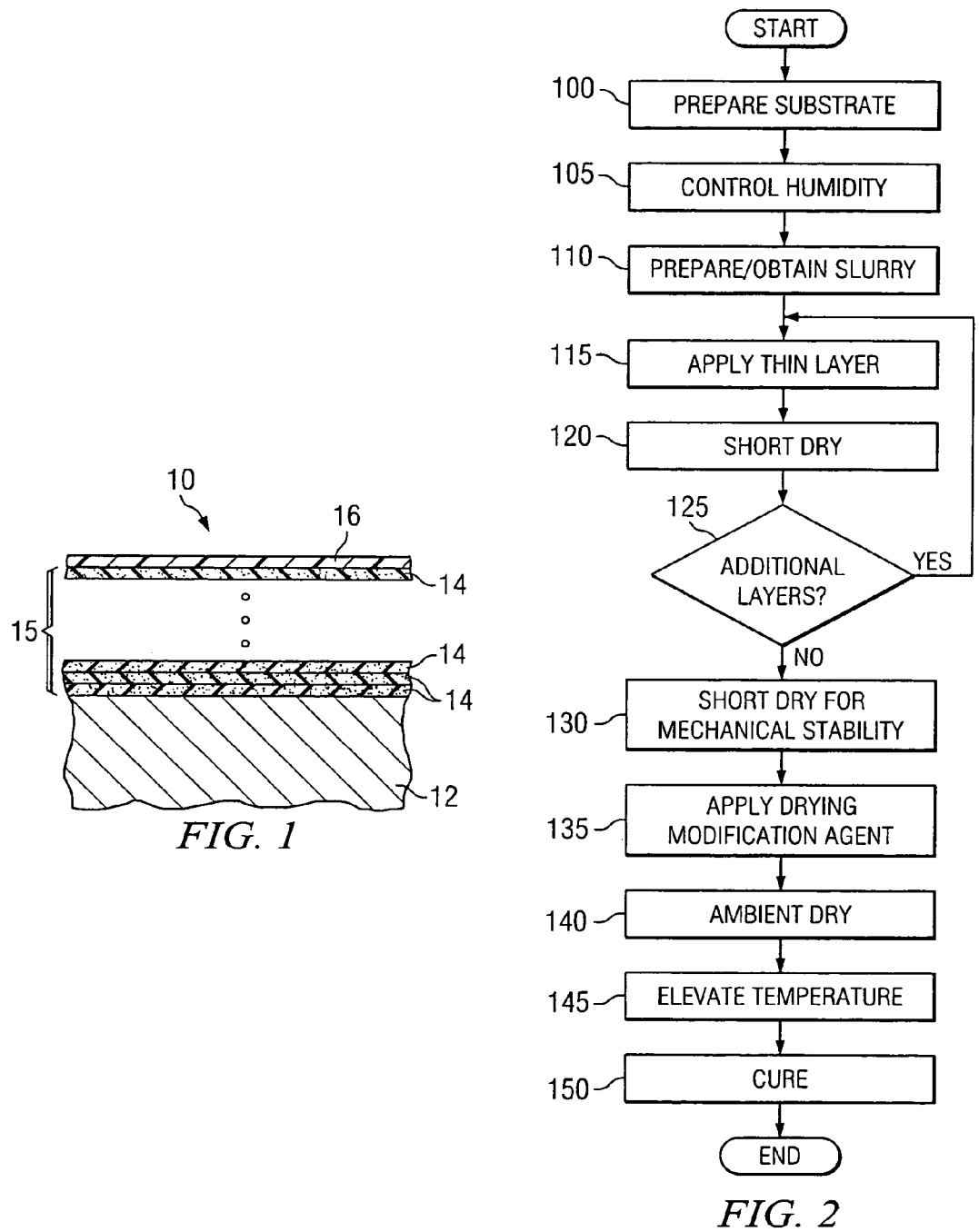

SYSTEM AND METHOD FOR FORMING A LOW TEMPERATURE CURED CERAMIC COATING FOR ELEVATED TEMPERATURE APPLICATIONS

RELATED APPLICATION

This invention is a divisional of co-pending and commonly assigned U.S. patent application Ser. No. 10/359,501, entitled SYSTEM AND METHOD FOR FORMING A LOW TEMPERATURE CURED CERAMIC COATING FOR ELEVATED TEMPERATURE APPLICATIONS, filed Feb. 5, 2003, now U.S. Pat. No. 6,797,327 the disclosure of which is hereby incorporated by reference herein.

TECHNICAL FIELD

This invention relates generally to the field of ceramic coatings and, more specifically, to a method and system for forming a low temperature cured ceramic coating for elevated temperature applications.

BACKGROUND

Ceramic coatings are often applied to jet engine and exhaust components for thermal protection and energy absorption. Ceramic coatings are often formed by applying water-diluted, cement-based ceramic slurries, followed by ambient environment evaporation of the water of solution and elevated temperature curing of the cement to remove water of hydration. The cements are typically silicates of alkali metals and are used to bind together the appropriate ceramic oxides and energy absorbing fillers. The cements may also function as a primer to adhere the coating to a metallic, ceramic or other substrate.

Most ceramic coatings are cured at temperatures of 1,000° Fahrenheit or greater. Ceramic coatings that are applied under normal, ambient conditions and cured at low temperatures tend to crack and fail. Low temperature curable ceramic coatings, with or without a drying control agent, may also crack and fail if applied and cured rapidly.

SUMMARY

In accordance with one embodiment of the present invention, a system and method for forming a low temperature cured ceramic coating for elevated temperature environments is provided that substantially eliminates or reduces disadvantages and problems associated with previously developed systems and methods.

In accordance with one embodiment of the present invention, a method for forming an elevated temperature durable coating on a surface of a substrate includes applying an aqueous slurry comprising lithium silicate, sodium silicate, potassium silicate, zirconia powder, a fibrous agent, and a magnetic powder to a surface of a substrate in one or more layers of substantially uniform thickness to form a coating. A substantially controlled humidity environment is maintained during application of the aqueous slurry and the coating is ambient dried for a period. A drying agent is applied to the coating and formation of a dry crust is prevented on the coating during ambient drying. After the period, the coating is heat cured.

In accordance with another embodiment of the present invention, a heat resistant component for high temperature applications includes a coating comprising matrix materials, binder materials, strengthener materials, and magnetic fillers applied in one more substantially uniform thin layers to a component. The coating is applied in a substantially controlled humidity environment and dried for a period between application of each of the one or more thin layers. A drying agent is applied to the coating and the coating and drying agent are heat cured for a period.

Technical advantages of one or more embodiments of the present invention include providing a heat resistant ceramic coating and method for high temperature applications that includes applying an aqueous slurry and a drying agent to the substrate in a substantially controlled humidity environment to form a coating. After application of the aqueous slurry and drying agent, the coating is heat cured. Thus, a more uniformly cured coating with reduced drying stresses is provided.

Another technical advantage of one or more embodiments of the present invention includes providing a heat resistant, erosion resistant, ceramic coating which is substantially less susceptible to blisters, cracking, and shrinkage. More specifically, a ceramic coating is provided that does not develop large cracks and subsequently disbonds from the substrate. Moreover, the resultant coating forms a solid protective layer that is resistant to high humidity degradation or blistering after exposure to temperatures above 1,000° Fahrenheit. And longevity of substrates subjected to elevated temperatures is improved, reducing repair and/or replacement costs.

Other technical advantages of one or more embodiments of the present invention include providing a method for forming an elevated temperature durable coating on a surface of a substrate that includes applying an aqueous slurry and a drying agent to form a coating while maintaining a substantially controlled humidity environment during application of the coating. In this way, a low-cost method for providing a durable coating on a surface of a substrate for use in elevated temperature environments is provided that can be applied to ceramic, titanium, and other substrates. The coating is heat cured and the resultant coating provides a moisture-resistant protective coating typically allowing small cracks of less than ten millimeters when exposed to elevated temperature environments, thereby allowing the coating to tolerate strain without disbanding from the substrate.

Other technical advantages are readily apparent to one skilled in the art from the following figures, descriptions, and claims. Moreover, some, all, or none of the above technical advantages may be included in the various embodiments of the present invention.

BRIEF DESCRIPTION OF THE DRAWINGS

For a more complete understanding of the present invention and its advantages, reference is now made to the following description, taken in conjunction with the accompanying drawings, in which:

FIG. 1 illustrates an elevated temperature durable ceramic coating in accordance with one embodiment of the present invention; and FIG. 2 is a flowchart illustrating a method for forming the elevated temperature durable ceramic coating in accordance with one embodiment of the present invention.

DETAILED DESCRIPTION OF THE INVENTION

FIG. 1 illustrates a heat resistant component for elevated temperature applications of 1,000° Fahrenheit or greater in accordance with one embodiment of the present invention. Component 10 may be a jet engine component, exhaust component, or other suitable component. As used herein, a heat resistant component is a component that may be used in elevated temperature environments. As used herein, an elevated temperature environment generally means temperatures at or exceeding 950° to 1,000° Fahrenheit.

Component 10 includes component substrate 12, one or more layers of aqueous slurry 14 (which form coating 15), and one or more layers of drying modification agent 16. Component substrate 12 may comprise the surface of a jet engine component, a surface of an exhaust component, or other surface suitable for coating. Component substrate 12 may be pre-prepared for coating by, for example, cleaning, brushing, or otherwise prepared to enhance mechanical and chemical adhesion with the aqueous slurry 14 and drying modification agent 16.

As described in more detail below, an aqueous slurry is applied to component substrate 12 in one or more thin layers 14 of substantially uniform thickness. A thin layer may be a layer between two to five thousandths of an inch in thickness. As used herein, substantially uniform thickness means each of the one or more layers have a thickness variation of less than two thousandths of an inch in thickness. As used herein, each means all of at least a subset. In one embodiment of the present invention, between twenty-five to fifty layers 14 of aqueous slurry are applied to component substrate 12, resulting in an overall thickness of approximately fifty thousandths of an inch. Layers 14 form coating 15.

As described in more detail below, aqueous slurry 14 comprises matrix materials, binder materials, strengthener materials, and a magnetic filler. The matrix materials bind together appropriate ceramic oxides and energy absorbing fillers in the resultant coating. The matrix materials may be silicates of alkali metals, cements, a combination of two, or otherwise suitable matrix materials. The binder materials adhere the coating to the component substrate. The strengthener materials, provide improved resistance to cracking and may comprise fibrous agents, glass frit, corderite glass, or other suitable strengthener materials. The magnetic filler provides desired electrical, magnetic, and other characteristics in the resultant coating. Magnetic fillers may comprise, for example, iron oxide, iron powder, or other suitable fillers.

In a particular embodiment, aqueous slurry 14 comprises lithium silicate, sodium silicate, potassium silicate, zirconia powder, a fibrous agent, and a magnetic powder. In this embodiment, the water content of aqueous slurry 14 is controlled to between 15% and 20% by weight. Lithium silicate is present within the range of from about 5% to about 20% by weight. Sodium silicate is present within the range of from approximately 5% to 20% by weight. Potassium silicate is present within the range of from approximately 5% to 20% by weight. Zirconia powder is present within the range of from approximately 10% to 20% by weight. A fibrous agent is present within the range of from approximately 2% to 10% by weight. Magnetic powder is present within the range of approximately 40% to 75% by weight. Other suitable materials and proportions may be used.

The materials are mixed within an aqueous vehicle to provide a slurry of the insoluble dispersed zirconia powder, fibrous agent and magnetic powder and the water-soluble lithium, sodium, and potassium silicates. The majority of the water may be introduced as a component of the silicates, which are commercially available in aqueous form under the trade names AREMCO 516B, 516BT, and 516T from AREMCO PRODUCTS, INC. These materials typically have a water content of approximately 35% to 70% by weight. The remaining components may be added as dry powders, allowing for the addition of a small amount of water to maintain the water content between 15-20% by weight.

The zirconia powder has a particle size within the range of about 0.1 to 20 micrometers. In one embodiment, the zirconia powder is zirconium oxide with a particle size between about 0.3 and 3 micrometers. The fibrous agent may be glass frit or corderite glass or other suitable fibrous agent. In one embodiment, the fibrous agent has an average particle size between about 1 and 25 micrometers. Suitable magnetic fillers include iron oxide, iron powder, and similar magnetic powders and particles.

In one embodiment, zirconia may be substituted for magnetic powder, for example, to modify the magnetic signature of the resultant coating. The fibrous agent may be employed as a strengthener and may be substituted by short metallic fibers, or short ceramic fibers. As used herein, short means a length that will prevent nesting or clumps and clogging a spraying nozzle. Generally, a short fiber has an aspect ratio of approximately 2:1 to 3:1, or 1 to 20 microns.

Other suitable substitutions may also be made to achieve varying performance characteristics of the resultant coating. For example, for a stricter thermal barrier, more zirconia may be used. Other material may be used for other needs, for example black powder for a black color to the coatings.

The ingredients are uniformly mixed to form a slurry that may be applied to a substrate as a uniform layer of a desired thickness. The application of the coating is performed in a substantially controlled humidity environment with the relative humidity being maintained between 40% and 60%. As used herein, a substantially controlled humidity environment is an environment wherein the ambient relative humidity is maintained between approximately 40% and 60%. Each layer may be allowed to dry for 30 to 90 minutes before the subsequent layer is applied. These conditions may help prevent the coating from prematurely cracking and peeling off the surface of the substrate.

Drying modification agent 16 includes a substantially uniform layer applied to the coating 15. In one embodiment, drying modification agent 16 comprises a mixture of glycerol and propylene glycol in substantially equivalent proportions, however, other suitable drying modification agents may also be used. After application, drying modification agent 16 diffuses into the outer surface layers of coating 15 and prevents formation of a dry crust or skin during a subsequent ambient environment drying process. Thus, a more uniform curing of the coating is achieved and drying stresses are reduced.

FIG. 2 illustrates a method for coating a surface of a substrate in accordance with one embodiment of the present invention. The method begins at step 100, wherein the substrate to be coated is prepared. Such preparation may involve roughening the surface by mechanical means or applying a rough metallic layer by flame or plasma spraying. Next at step 105, the ambient environment humidity is controlled. In one embodiment, the environmental relative humidity is maintained between 40% and 60% during ambient drying. If the water is removed too fast blisters may form in the coating. If the water is removed too slowly, the coating may crack and shrink. Thus, controlling the humidity and heat in the environment where the coating is drying help form a more durable protective coating. The relative humidity may be maintained during the entire process, during ambient steps of the process or otherwise.

Next at step 110, an aqueous slurry is prepared or obtained in accordance with the composition as described above. Next at step 115, a thin or other suitable layer of the aqueous slurry is applied to the substrate. The thin layer may be a layer between two to five thousandths of an inch in thickness.

At step 120, the thin layer of aqueous slurry is allowed to dry for a short time period. In one embodiment, the thin layer is allowed to dry for approximately thirty to ninety minutes. The period may be suitably shorter or longer. In addition, several layers may be applied between ambient drying cycles. Next, at decisional step 125, a determination is made whether additional thin layers of aqueous slurry are to be applied. If at decisional step 125 additional layers of aqueous slurry are to be applied, the process proceeds along the Yes branch returning to step 115, wherein an additional thin layer of aqueous slurry is applied.

If at decisional step 125 no additional thin layers of aqueous slurry are to be applied, the process proceeds along the No branch to step 130. At step 130, the one or more layers of aqueous slurry are allowed to dry for a short period of time to achieve mechanical stability. In one embodiment, the layers of aqueous slurry are allowed to dry for approximately thirty to ninety minutes.

Next at step 135, a drying modification agent is applied to the top coating of the one or more layers of aqueous slurry. In one embodiment, the drying modification agent consists of a mixture of glycerol and propylene glycol in substantially equal proportion by volume. The drying modification agent soaks into the outer surface layer of the coating and modifies the coating preventing the formation of a dry crust or skin during the ambient environment dry process. This may result in more uniform curing of the coating and decreases the drying stresses that typically build up in ceramic coatings.

In one embodiment, the drying modification agent is applied in a layer approximately one to two thousandths of an inch thick. In this and other embodiments, the drying modification agent may be sprayed on but may also be brushed on. The drying modification agent may be operable to keep the top layers and bottom layers drying at the same rate, producing an evenly dried area and preventing cracking and blistering.

Next at step 140, the coating is allowed to dry in the ambient environment. In one embodiment, the component is allowed to dry for a minimum of six hours after application of the drying agent. This time period may be suitable varied or omitted. Next at step 145, the environment temperature is increased above ambient. In one embodiment, the temperature is increased at a rate of heating below 1.5° Fahrenheit per minute. As used herein, a rate of heating means the ramp up or down of the ambient temperature.

Next at step 150, the coating is heat cured. In one embodiment, the coating is cured by maintaining the temperature of the ambient environment at about 350° Fahrenheit for a minimum of ninety minutes. As used herein, about 350° Fahrenheit means a temperature range of between 325° Fahrenheit and 375° Fahrenheit. Other suitable heat cured temperatures above 125° Fahrenheit may be used. In one embodiment, total cure time is approximately 12 hours. The resultant coating may yield a heat-resistant, erosion-resistant, protective ceramic coating. After the coating is cured the process ends.

Although the method of FIG. 2 has been shown with specific steps in a specific order, it will be understood that the steps may be performed in a different order as appropriate and other steps may be added or omitted as appropriate in keeping with the spirit of the present invention.

Although the present invention has been described with several embodiments, various changes and modifications may be suggested to one skilled in the art. It is intended that the present invention encompass such changes and modifications as fall within the scope of the appended claims.

What is claimed is:

1. A heat resistant component for high temperature applications, comprising:
   a coating comprising one or more substantially uniform thin layers applied outwardly of a surface of a component in a substantially controlled humidity environment;
   the layers each comprising a matrix material, binder material, strengthener material, and magnetic filler;
   the layers each dried for a period before application of a next one of the layers; and
   a drying agent applied to the coating, said drying agent consisting of a mixture of glycerol and propylene glycol in substantially equal proportions by volume;
   and the coating and drying agent heat cured together for a period of at least 90 minutes, wherein said drying agent soaks into an outer surface layer of said coating and modifies said coating to prevent formation of a dry crust.

2. The component of claim 1, wherein the matrix materials comprise at least one of a silicate of alkali metal and cement.

3. The component of claim 2, wherein the silicate of alkali metal comprises lithium silicate, sodium silicate, and potassium silicate.

4. The heat resistant component of claim 3, wherein said lithium silicate is present within the range of from about 5% to about 20% by weight.

5. The heat resistant component of claim 3, wherein said sodium silicate is present within the range of from about 5% to about 20% by weight.

6. The heat resistant component of claim 3, wherein said potassium silicate is present within the range of from about 5% to about 20% by weight.

7. The component of claim 1, wherein the strengthener materials comprise at least one of glass frit, corderite glass, metallic fibers and ceramic fibers.

8. The component of claim 1, wherein the magnetic filler comprises at least one of iron oxide and iron powder.

9. The heat resistant component of claim 1, wherein the coating and drying agent are heat cured at about 350° Fahrenheit for a period of about ninety minutes.

10. The heat resistant component of claim 1, wherein said coating and said drying agent are heat cured together for a period of 12 hours.

11. The heat resistant component of claim 1, wherein said drying agent and said coating are ambient died before being heat cured together.

12. The heat resistant component of claim 1, wherein said drying agent is applied to said coating in a substantially uniform layer.

13. The heat resistant component of claim 1, wherein each of said layers is dried for a period of 30-90 minutes before application of a next one of said layers.

14. The heat resistant component of claim 1, wherein application of said coating is performed in a substantially controlled humidity environment.

15. The heat resistant component of claim 14, wherein the relative humidity of said humidity environment is maintained between 40% and 60%.

* * * * *